US012317091B2

(12) United States Patent
Kondareddy

(10) Patent No.: US 12,317,091 B2
(45) Date of Patent: May 27, 2025

(54) COEXISTENCE OF ISOCHRONOUS COMMUNICATION DEVICE WITH CO-LOCATED ASYNCHRONOUS COMMUNICATION DEVICE

(71) Applicant: Cypress Semiconductor Corporation, San Jose, CA (US)

(72) Inventor: Raghunatha Kondareddy, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 19 days.

(21) Appl. No.: 17/012,251

(22) Filed: Sep. 4, 2020

(65) Prior Publication Data
US 2022/0078623 A1   Mar. 10, 2022

(51) Int. Cl.
*H04W 16/14* (2009.01)
*G06F 13/20* (2006.01)
*H04W 28/26* (2009.01)

(52) U.S. Cl.
CPC ............ *H04W 16/14* (2013.01); *G06F 13/20* (2013.01); *H04W 28/26* (2013.01)

(58) Field of Classification Search
CPC ... H04L 1/0013; H04L 1/0068; H04L 5/0044; H04L 5/0094; H04W 16/14; H04W 28/26; H04W 4/80; H04W 72/1215; H04W 76/16; H04W 84/12; H04W 88/06
See application file for complete search history.

(56) References Cited

U.S. PATENT DOCUMENTS

| 2015/0111610 | A1* | 4/2015 | Hwang | H04W 74/0816 455/553.1 |
| 2018/0242339 | A1* | 8/2018 | Choudhary | H04W 4/80 |
| 2019/0239140 | A1* | 8/2019 | Arickan | H04W 40/16 |
| 2021/0083699 | A1* | 3/2021 | Gao | H04L 25/49 |
| 2022/0015112 | A1* | 1/2022 | Chen | H04W 72/1231 |

OTHER PUBLICATIONS

Martin Woolley, Bluetooth Core Specification Version 5.2 Feature Overview ,Dec. 9, 2020, Version 1.0.1 (Year: 2020).*

* cited by examiner

*Primary Examiner* — Jason E Mattis
*Assistant Examiner* — Bao G Nguyen

(57) ABSTRACT

Apparatus, systems and associated methods includes an isochronous communication device and a co-located asynchronous communication device, where the isochronous communication device and the asynchronous communication device share a common radio frequency spectrum. Also includes is a coexistence bus coupled between the isochronous communication device and the asynchronous communication device to transmit isochronous data information to the asynchronous communication device, where the isochronous data information includes an isochronous interval and a duration of isochronous data for transmission within the isochronous interval. The asynchronous communication device is configured to reserve the common radio frequency spectrum for the duration of the isochronous data transmission, and to aggregate asynchronous data for transmission within the isochronous interval after the duration of the isochronous data transmission.

20 Claims, 4 Drawing Sheets

COEXISTENCE OF ISOCHRONOUS COMMUNICATION DEVICE WITH CO-LOCATED ASYNCHRONOUS COMMUNICATION DEVICE

FIELD

The present disclosure is related to the coexistence of co-located isochronous and asynchronous communication devices that share a common radio frequency spectrum.

BACKGROUND

In Classic Bluetooth® Audio distribution, based on asynchronous connectionless (ACL) communication between a Master (Source) communication device and one or more Slave (Sink) communication devices, the Bluetooth® (BT) link depends entirely on data scheduling by the Master. The asynchronous nature of the BT communication makes it difficult for any multi-device coexistence algorithm for co-located communication devices in the same frequency band to predict the interval and duration of audio data transmitted from the Master to the Slave(s). As a result, Wi-Fi® traffic from an IEEE 802.11 communication device (or any other asynchronous communication standard) co-located with the BT communication device and sharing the same radio frequency spectrum, is pre-empted every time there is a new BT transmission request. This pre-emption cuts off any Wi-Fi packet that was already being transmitted, requiring a retransmission of the entire packet and disrupting the rate control algorithm in the Wi-Fi communication device. Additionally, the algorithm in the Wi-Fi communication device that grants medium access to the BT communication device does not know the duration of the BT packet and therefore reserves the medium for the longest BT packet allowed, which can prevent the Wi-Fi communication device from accessing the medium after a shorter BT packet has completed.

SUMMARY

The present disclosure describes examples of systems, methods and apparatus for managing the coexistence of an isochronous communication device (such as a Bluetooth® Low Energy (BLE) communication device) with a co-located asynchronous communication device (such as an IEEE 802.11 compliant communication device) operating in a shared radio frequency spectrum.

In one example, an apparatus according to the present disclosure includes an isochronous communication device, a co-located asynchronous communication device and a coexistence bus coupled between the isochronous communication device and the asynchronous communication device, where the isochronous communication device and the asynchronous communication device share a common radio frequency spectrum. The isochronous communication device is configured to transmit isochronous data information to the asynchronous communication device over the coexistence bus, where the isochronous data information includes an isochronous interval and the duration of iso-chronous data for transmission within the isochronous interval. The asynchronous communication device is configured to reserve the common radio frequency spectrum for the duration of the isochronous data transmission, and to aggregate asynchronous data for transmission within the isochronous interval after the duration of the isochronous data transmission.

In one example, the isochronous communication device comprises a Bluetooth® Low Energy (BLE) communication device, and the co-located asynchronous communication device comprises an IEEE 802.11 WLAN (Wi-Fi®) communication device.

In one example, the isochronous interval comprises a BLE isochronous (ISO) interval and the duration of the isochronous data transmission comprises a duration of BLE isochronous data transmission within the BLE ISO interval, where the Wi-Fi communication device is configured to reserve the common radio frequency spectrum for the duration of the BLE isochronous data transmission, and to aggregate Wi-Fi data for transmission within the BLE ISO interval after the duration of the BLE isochronous data transmission.

In one example, the isochronous data information further includes a BLE transmission mode selected from one of a broadcast isochronous stream (BIS) and a number of connected isochronous streams (CIS).

In one example, the BLE isochronous data comprise a BLE audio stream, where the BLE audio stream comprises at least one connected isochronous stream (CIS) to a connected isochronous group (CIG) or a broadcast isochronous stream (BIS) to a broadcast isochronous group (BIG).

In one example, according to the present disclosure, a method in a device comprising an isochronous communication device and a co-located asynchronous communication device sharing a common radio frequency spectrum includes transmitting, by the isochronous communication device, isochronous data information over a coexistence bus to the asynchronous communication device, where the isochronous data information includes an isochronous interval and a duration of isochronous data for transmission within the isochronous interval. The example method also includes reserving, by the asynchronous communication device, the common radio frequency spectrum for the duration of the isochronous data transmission, and aggregating asynchronous data for transmission within the isochronous interval after the duration of the isochronous data transmission.

In one example, a system according to the present disclosure includes a processor; a bus coupled to the processor; an isochronous communication device coupled to the bus; an asynchronous communication device coupled to the bus, where the isochronous communication device and the asynchronous communication device share a common radio frequency spectrum; and a non-transitory computer-readable memory containing instructions that, when executed by the processor, cause the system to perform operations, including transmitting, by the isochronous communication device, isochronous data information over the bus to the asynchronous communication device, where the isochronous data information includes an isochronous interval and a duration of isochronous data for transmission within the isochronous interval; and reserving, in the asynchronous communication device, the shared radio frequency spectrum for the duration of the isochronous data transmission, and aggregating asynchronous data for transmission within the isochronous interval after the duration of the isochronous data transmission.

BRIEF DESCRIPTION OF THE DRAWINGS

For a more complete understanding of various examples, reference is now made to the following detailed description taken in connection with the accompanying drawings in which like identifiers correspond to like elements.

DETAILED DESCRIPTION

Systems, methods and apparatus are disclosed for managing the coexistence of co-located isochronous and asynchronous communication devices in a shared common radio frequency spectrum. As used herein, the term "isochronous" means the synchronized transmission of data to a group of receivers.

Figure 1:
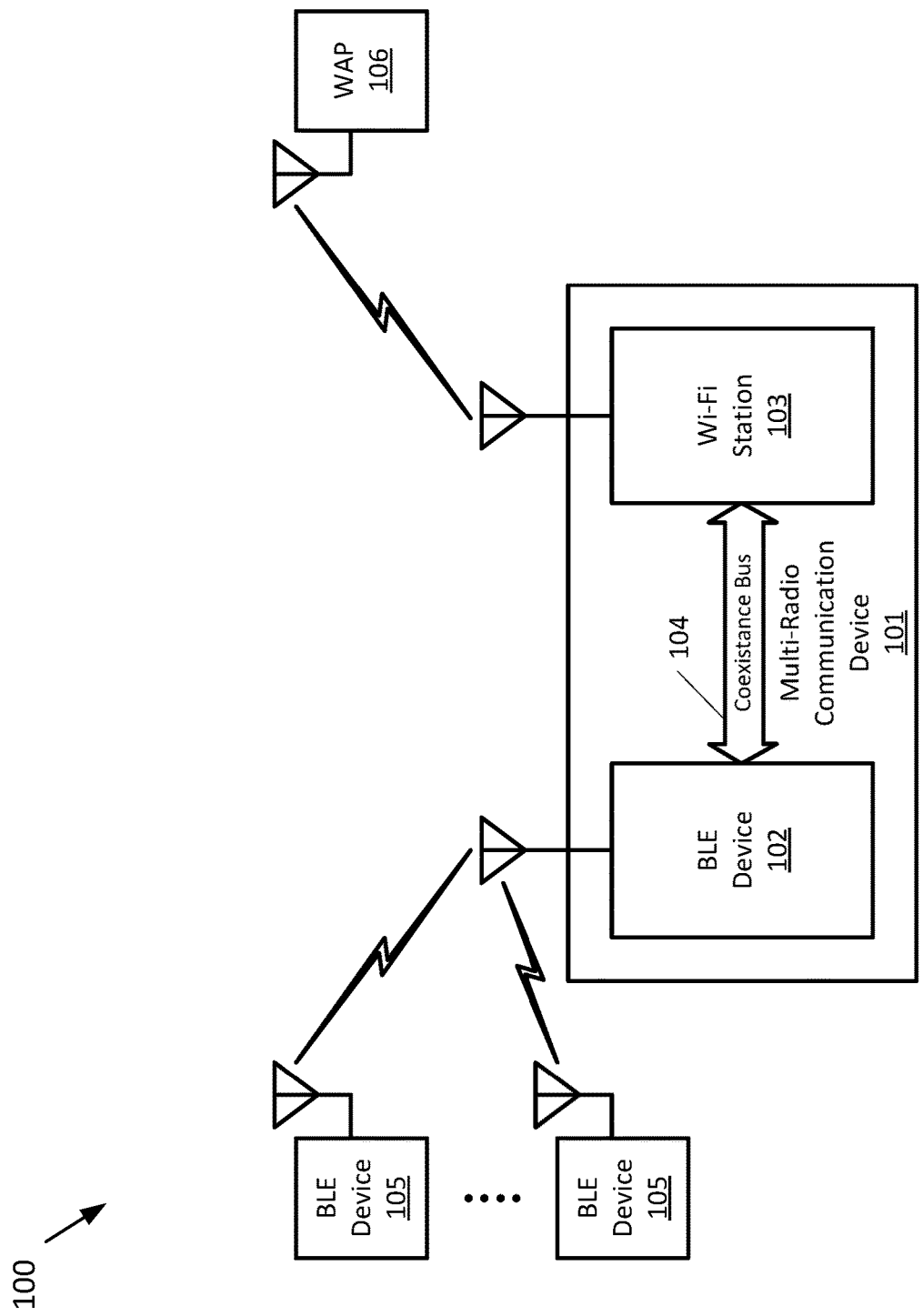
FIG. 1 is a block diagram illustrating an example system for managing communication device coexistence according to the present disclosure.

FIG. 1 is a block diagram illustrating an example system 100 for managing the coexistence of co-located isochronous and asynchronous communication devices sharing a common radio frequency spectrum. System 100 includes a multi-radio communication device 101 with an isochronous communication device, Bluetooth® Low Energy (BLE) communication device 102. BLE communication device 102 may be compliant with Bluetooth® Core Specification version 5.2, for example, which supports isochronous audio data transmission in the 2.4 GHz ISM (industrial, scientific and medical) Band. BLE communication device 102 may operate as the master device in a Bluetooth® network, controlling one or more BLE slave devices 105. BLE communication device 102 may transmit connected isochronous streams (CIS) to one or more BLE devices 105 comprising a connected isochronous group (CIG). BLE communication device 102 may also transmit a broadcast isochronous stream (BIS) to a group of BLE devices 105 comprising a broadcast isochronous group (BIG).

Multi-radio communication device 101 also includes an asynchronous communication device, an IEEE 802.11 compliant Wi-Fi communication device 103 in the example of system 100, which also operates in the 2.4 GHz ISM band. Wi-Fi communication device 103 may operate as a wireless station in a wireless local area network (WLAN) controlled by a wireless access point (WAP) 106.

Multi-radio communication device 101 also includes a coexistence bus 104 coupled between the isochronous communication device 102 and the asynchronous communication device 103. Coexistence bus 104 is configured to transmit isochronous data information from the isochronous communication device 102 to the asynchronous communication device 103. In one example, the isochronous data information includes the duration of an isochronous (ISO) interval for each data frame of the isochronous communication device 102, and a duration of the isochronous data for transmission within the ISO interval, where the duration of the ISO interval and the duration of the isochronous data can vary from frame to frame. In the example of system 100, the ISO interval comprises a BLE ISO interval and the isochronous data may comprise a BLE isochronous audio stream in either a connected mode or a broadcast mode. In one example, the isochronous data information may also include the BLE transmission mode selected from one of a broadcast isochronous stream (BIS) and a number of connected isochronous streams (CIS).

In one example, the asynchronous communication device 103 is configured to reserve the shared radio frequency spectrum (e.g., the 2.4 GHz ISM band) to the isochronous communication device 102 for the duration of the isochronous data transmission, based on the isochronous data information. The asynchronous communication device 103 is also configured to aggregate asynchronous data for transmission within the isochronous interval after the duration of the isochronous data transmission, as described in greater detail below.

In one example, the asynchronous communication device 103 may perform the coexistence operations described herein as part of a coexistence algorithm operating within an overall packet traffic arbitration (PTA) algorithm. In one example, the asynchronous communication device 103 may include a dedicated processor to receive and process the isochronous data information in a coexistence algorithm that runs independently of any normal PTA algorithm performed by the asynchronous communication device 103. In one example, the coexistence bus 104 may include an independent coexistence processor to receive the isochronous data information from the isochronous communication device 102, analyze the coexistence data information in a coexistence algorithm, and direct the asynchronous communication device 103 to perform the spectrum reservation and data aggregation operations described herein.

In the example of system 100, the isochronous interval comprises a BLE isochronous (ISO) interval and the duration of the isochronous data transmission comprises the duration of a BLE isochronous data transmission within the BLE ISO interval, where the Wi-Fi communication device is configured to reserve the common radio frequency spectrum for the duration of the BLE isochronous data transmission, and to aggregate Wi-Fi data for transmission within the BLE ISO interval after the duration of the BLE isochronous data transmission.

Figure 2:
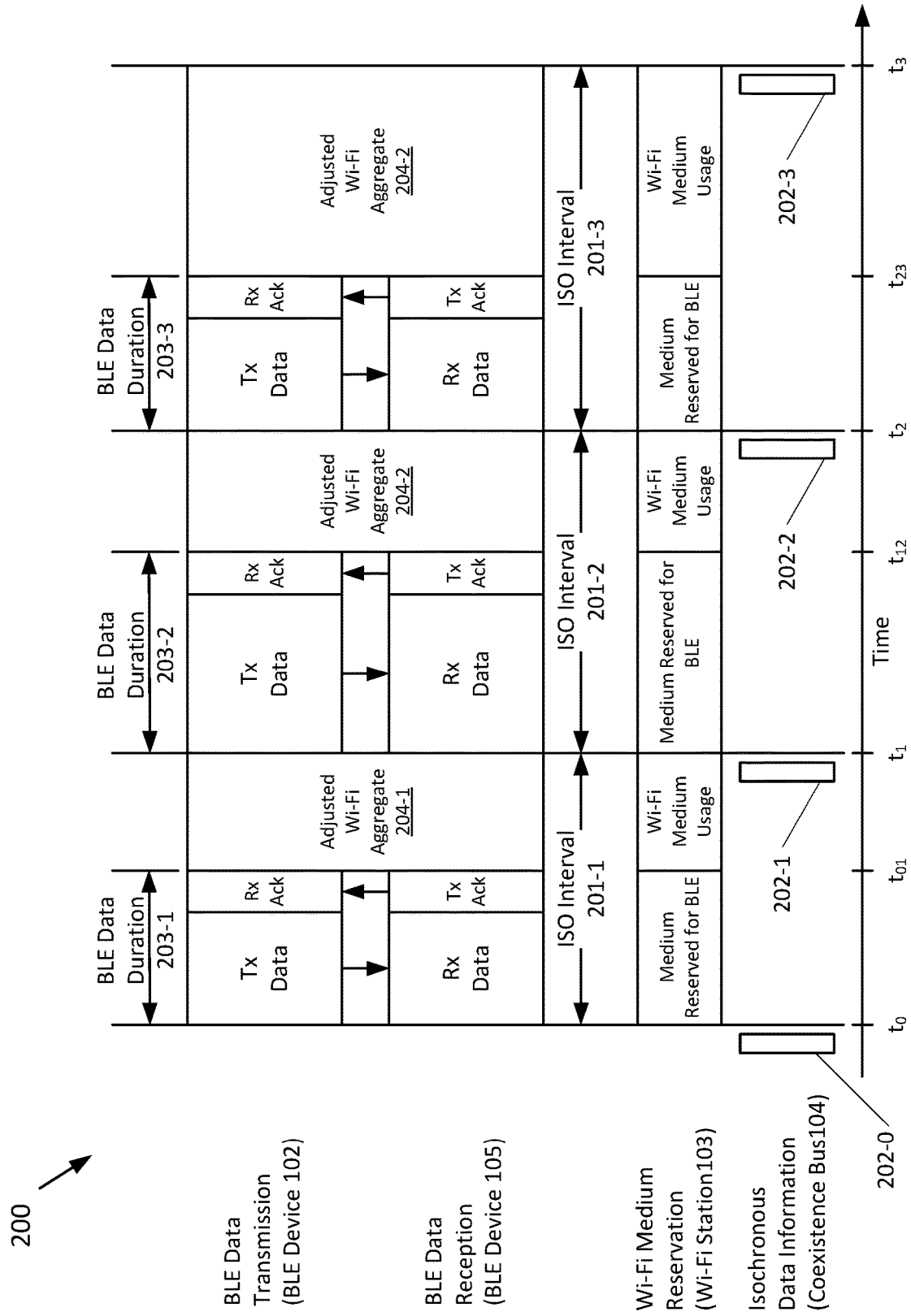
FIG. 2 is a timing diagram illustrating an example method for managing communication device coexistence according to the present disclosure.

FIG. 2 is a timing diagram 200 illustrating an example of the coexistence operation of isochronous BLE communication device 102 and asynchronous Wi-Fi communication device 103 over three exemplary ISO intervals, enabled by the coexistence bus 104.

As illustrated in FIG. 2, prior to the beginning of ISO interval 201-1 at to, isochronous data information 202-0 is transmitted from BLE communication device 102 to Wi-Fi communication device 203 over coexistence bus 104. The isochronous data information includes the duration of ISO interval 201-1 and the duration of BLE data 203-1 within ISO interval 201-1. Note that the BLE data duration 203-1 is defined as the time required for the BLE data to be transmitted (Tx Data) by the BLE communication device 102 and received (Rx Data) by the BLE slave(s) 105, plus the time for Tx and Rx acknowledgements.

The Wi-Fi communication device 103 uses the isochronous data information 202-0 to reserve the shared radio frequency spectrum for use by the BLE communication device 102 to transmit BLE data during BLE data duration 203-1. The Wi-Fi communication device 103 also uses the isochronous data information 202-0 to calculate how much Wi-Fi data 204-1 to aggregate for transmission to match the time interval between the end of the BLE data duration 203-1 at $t_{01}$ and the end of ISO interval 201-1 at $t_1$, and transmits the Wi-Fi data during that interval.

Before the end of ISO interval 201-1 at $t_1$, the BLE communication device 102 sends isochronous data information 202-1 over the coexistence bus 104 to Wi-Fi communication device 103. The isochronous data information includes the duration of ISO interval 201-2 and the duration of BLE data 203-2 within ISO interval 201-2. Again, note that the BLE data duration 203-1 is defined as the time required for the BLE data to be transmitted (Tx Data) by the BLE communication device 102 and received (Rx Data) by the BLE slave(s) 105, plus the time for Tx and Rx acknowledgements.

The Wi-Fi communication device 103 uses the isochronous data information 202-1 to reserve the shared radio frequency spectrum for use by the BLE communication device 102 to transmit BLE data during BLE data duration 203-2. The Wi-Fi communication device 103 also uses the isochronous data information 202-1 to calculate how much Wi-Fi data 204-2 to aggregate for transmission to match the time interval between the end of the BLE data duration 203-2 at $t_{12}$ and the end of ISO interval 201-2 at $t_2$, and transmits the Wi-Fi data during that interval.

Before the end of ISO interval 201-2, the BLE communication device 102 sends isochronous data information 202-2 over the coexistence bus 104 to Wi-Fi communication device 103. The isochronous data information 202-1 includes the duration of ISO interval 201-3 and the duration of BLE data 203-3 within ISO interval 201-3. Again, the BLE data duration 203-3 is defined as the time required for the BLE data to be transmitted (Tx Data) by the BLE communication device 102 and received (Rx Data) by the BLE slave(s) 105, plus the time for Tx and Rx acknowledgements.

The Wi-Fi communication device 103 uses the isochronous data information 202-2 to reserve the shared radio frequency spectrum for use by the BLE communication device 102 to transmit BLE data during BLE data duration 203-3. The Wi-Fi communication device 103 also uses the isochronous data information 202-2 to calculate how much Wi-Fi data 204-3 to aggregate for transmission to match the time interval between the end of the BLE data duration 203-2 at $t_{23}$ and the end of ISO interval 201-2 at $t_3$, and transmits the Wi-Fi data during that interval.

Before the end of ISO interval 201-3 at $t_3$, the BLE communication device sends isochronous data information 202-3 over the coexistence bus 104 to Wi-Fi communication device 103 to set up the next frame, and so on.

Figure 3:
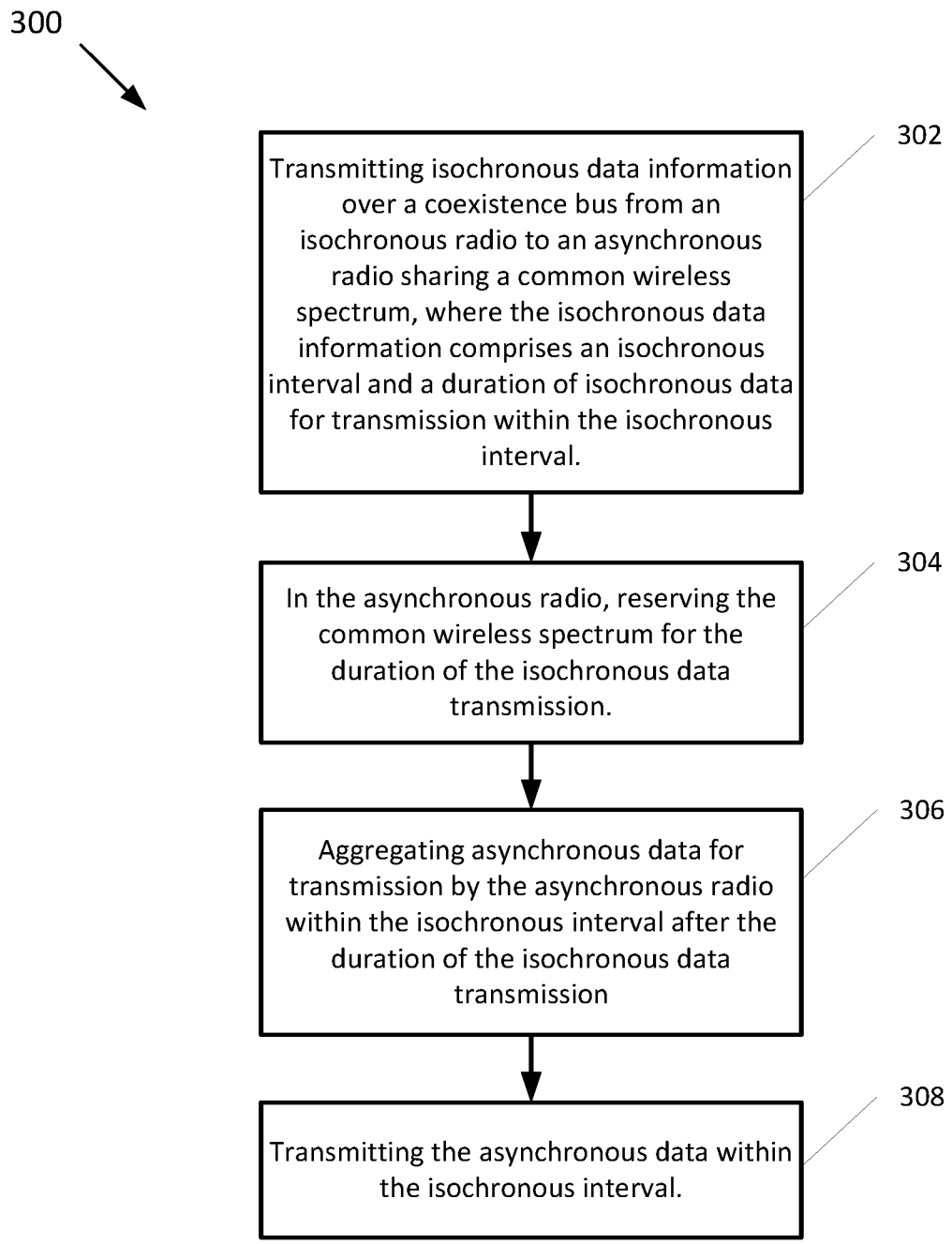
FIG. 3 is a flowchart illustrating an example method for managing communication device coexistence according to the present disclosure.

FIG. 3 is a flowchart 300 illustrating an example method for managing the coexistence of co-located isochronous and asynchronous communication devices sharing a common radio frequency spectrum.

Method 300 begins at operation 302, where isochronous data information is transmitted over a coexistence bus (e.g., bus 104) from an isochronous communication device (e.g., BLE communication device 102) to an asynchronous communication device (e.g., Wi-Fi communication device 103) sharing a common wireless spectrum (e.g., 2.4 GHz ISM band), where the isochronous data information comprises an isochronous interval (e.g., 201-1, 201-2, etc.) and a duration of isochronous data (202-1, 202-2, etc.) for transmission within the isochronous interval. Method 300 continues at operation 304, where the asynchronous communication device reserves the common wireless spectrum for the duration of the isochronous data transmission. Next, method 300 continues at operation 306, where the asynchronous communication device aggregates asynchronous data for transmission by the asynchronous communication device within the isochronous interval, after the duration of the isochronous data transmission. Method 300 concludes at operation 308, where the asynchronous communication device transmits the aggregated data within the isochronous interval.

Figure 4:
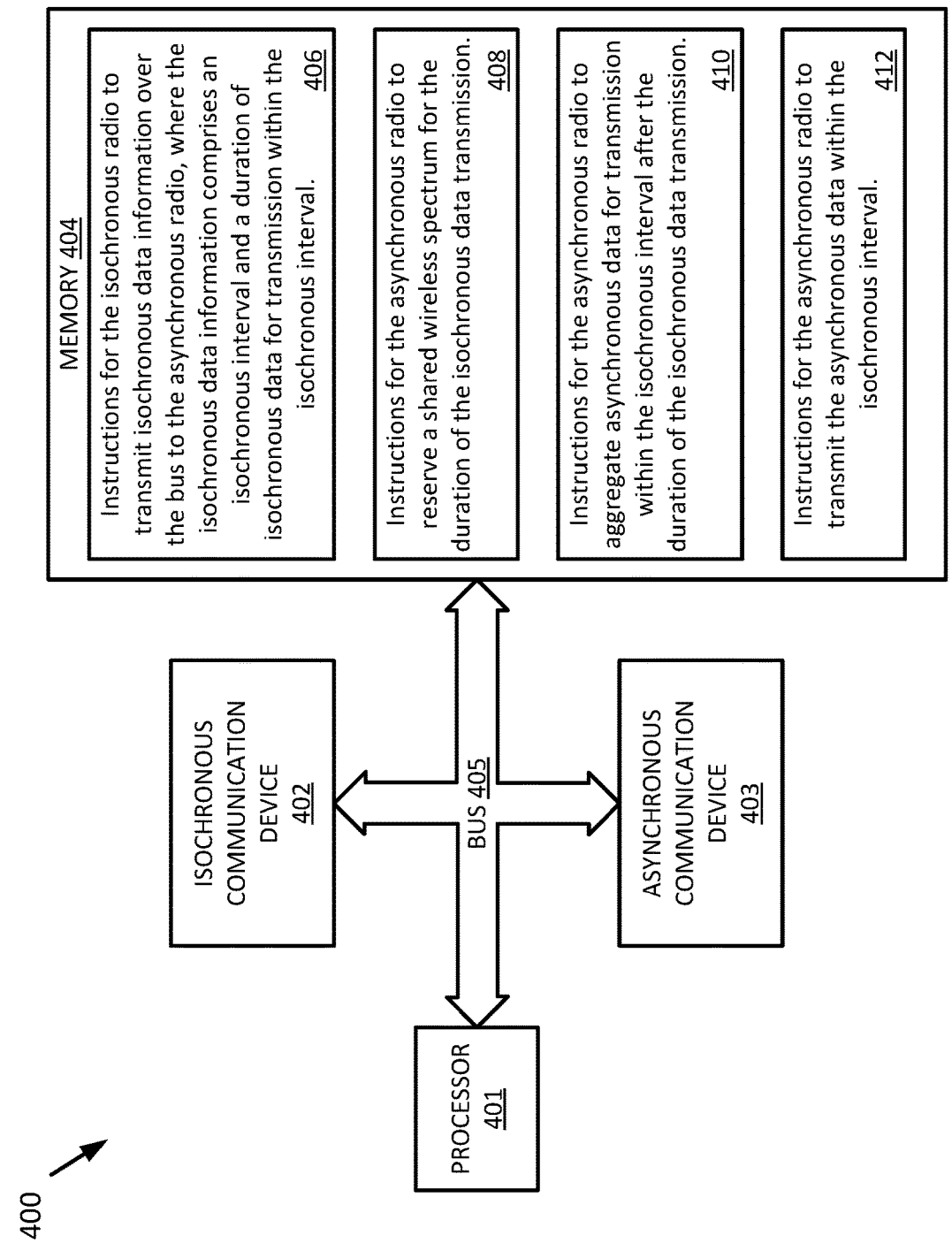
FIG. 4 is a block diagram illustrating an example system for managing communication device coexistence according to the present disclosure.

FIG. 4 is a block diagram of an example system 400 for managing the coexistence of co-located isochronous and asynchronous communication devices sharing a common radio frequency spectrum. System 400 includes a processor 401, an isochronous communication device 402, an asynchronous communication device 403, and a memory 404, all interconnected by a bus 405.

In some examples, processor 401 may be one or more general-purpose processing devices such as a microprocessor, central processing unit, or the like. More particularly, the processor 401 may be a complex instruction set computing (CISC) microprocessor, reduced instruction set computer (RISC) microprocessor, very long instruction word (VLIW) microprocessor, or processor implementing other instruction sets, or processors implementing a combination of instruction sets. The processor 401 may also be one or more special-purpose processing devices such as an application specific integrated circuit (ASIC), a field programmable gate array (FPGA), a digital signal processor (DSP), network processor, or the like.

Memory 404 may be any type of non-transitory computer-readable medium such as RAM, ROM, PROM, EPROM, EEPROM, flash memory, magnetic disk memory or optical disk memory for example.

Bus 405 may be any general or special purpose bus configured to transmit control signals, data and instructions between processor 401, isochronous communication device 402, asynchronous communication device 403 and memory 404. In particular, bus 405 may be configured to transmit isochronous data information from isochronous communication device 402 to asynchronous communication device 403 for managing the coexistence of isochronous communication device 402 and asynchronous communication device 403 in their use of the common radio frequency spectrum.

In one example, memory 404 contains instructions that, when executed by processor 401, cause the system 400 to perform operations for managing the coexistence of isochronous communication device 102 and asynchronous communication device 103. For example, memory 404 includes instructions 406 for the isochronous communication device 402 to transmit isochronous data information over the bus 405 to the asynchronous communication device 403, where the isochronous data information includes an isochronous interval (e.g., 201-1, 201-2, 201-3, etc.) and a duration of isochronous data (e.g., 203-1, 203-2, 203-3, etc.) for transmission within the isochronous interval. Memory 404 also includes instructions 408 for the asynchronous communication device to reserve a shared wireless spectrum for the duration of the isochronous data transmission. Memory 404 also includes instructions 410 for the asynchronous communication device to aggregate asynchronous data (e.g., 204-1, 204-2, 204-3, etc.) for transmission within the isochronous interval after the duration of the isochronous data transmission. Finally, memory 404 includes instructions 412 for the asynchronous communication device to transmit the asynchronous data within the isochronous interval.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in simple block diagram form in order to avoid unnecessarily obscuring the present disclosure.

Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operation may be performed, at least in part, concurrently with other operations. Instructions or sub-operations of distinct operations may be performed in an intermittent or alternating manner.

The above description of illustrated examples of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. As used in this application, the terms "coupled to" or "coupled with" in the context of connected components or systems, includes both directly coupled components or systems, and components or systems that are indirectly coupled through other components, systems of interfaces.

What is claimed is:

1. An apparatus, comprising:
   an isochronous communication device;
   a co-located asynchronous communication device, wherein the isochronous communication device and the asynchronous communication device share a common radio frequency spectrum; and
   a coexistence bus coupled between the isochronous communication device and the asynchronous communication device to, for each isochronous interval of a plurality of isochronous intervals, transmit isochronous data information to the asynchronous communication device, the isochronous data information comprising the isochronous interval and a duration of isochronous data for transmission within the isochronous interval, wherein the isochronous data information is transmitted during prior data transmission in another isochronous interval preceding the isochronous interval, the asynchronous communication device to:
   reserve the common radio frequency spectrum for the duration of the isochronous data transmission, and
   based on the isochronous data information received via the coexistence bus, calculate an amount of asynchronous data to aggregate for transmission within the isochronous interval after the duration of the isochronous data transmission.

2. The apparatus of claim 1, wherein the isochronous communication device comprises a Bluetooth® Low Energy (BLE) communication device, and wherein the co-located asynchronous communication device comprises an IEEE 802.11 WLAN (Wi-Fi®) communication device.

3. The apparatus of claim 2, wherein the isochronous interval comprises a BLE isochronous (ISO) interval and the duration of the isochronous data transmission comprises a duration of BLE isochronous data transmission within the BLE ISO interval, the Wi-Fi communication device to reserve the common radio frequency spectrum for the duration of the BLE isochronous data transmission, and to aggregate Wi-Fi data for transmission within the BLE ISO interval after the duration of the BLE isochronous data transmission.

4. The apparatus of claim 3, wherein the isochronous data information further comprises a BLE transmission mode selected from one of a broadcast isochronous stream (BIS) and a plurality of connected isochronous streams (CIS).

5. The apparatus of claim 3, wherein the BLE isochronous data comprise a BLE audio stream.

6. The apparatus of claim 5, wherein the BLE audio stream comprises at least one connected isochronous stream (CIS) to a connected isochronous group (CIG).

7. The apparatus of claim 5, wherein the BLE audio stream comprises a broadcast isochronous stream (BIS) to a broadcast isochronous group (BIG).

8. A method in a device comprising an isochronous communication device and a co-located asynchronous communication device sharing a common radio frequency spectrum, the method comprising:
   in the isochronous communication device, for each isochronous interval of a plurality of isochronous intervals, transmitting isochronous data information over a coexistence bus to the asynchronous communication device, wherein the isochronous data information comprises the isochronous interval and a duration of isochronous data for transmission within the isochronous interval, and is transmitted during prior data transmission in another isochronous interval preceding the isochronous interval; and
   in the asynchronous communication device, reserving the common radio frequency spectrum for the duration of the isochronous data transmission, and based on the isochronous data information received via the coexistence bus, calculate an amount of asynchronous data to aggregate for transmission within the isochronous interval after the duration of the isochronous data transmission.

9. The method of claim 8, wherein the isochronous communication device comprises a Bluetooth® Low Energy (BLE) communication device, and wherein the co-located asynchronous communication device comprises an IEEE 802.11 WLAN (Wi-Fi®) radio.

10. The method of claim 9, wherein the isochronous interval comprises a BLE isochronous (ISO) interval and the duration of the isochronous data transmission comprises a duration of BLE isochronous data transmission within the ISO interval, the method further comprising:
reserving the common radio frequency spectrum for the duration of the BLE isochronous data transmission; and
aggregating Wi-Fi data for transmission within the BLE ISO interval after the duration of the BLE isochronous data transmission.

11. The method of claim 10, wherein the isochronous data information further comprises a BLE transmission mode selected from one of a broadcast isochronous stream (BIS) and a number of connected isochronous streams (CIS).

12. The method of claim 10, wherein the BLE isochronous data transmission comprises a BLE audio stream.

13. The method of claim 12, wherein the BLE audio stream comprises one of a connected isochronous stream (CIS) to a connected isochronous group (CIG).

14. The method of claim 12, wherein the BLE audio stream comprises a broadcast isochronous stream (BIS) to a broadcast isochronous group (BIG).

15. A system, comprising:
a processor;
a bus coupled to the processor;
an isochronous communication device coupled to the bus;
an asynchronous communication device coupled to the bus, wherein the isochronous communication device and the asynchronous communication device share a common radio frequency spectrum; and
a non-transitory computer-readable memory containing instructions that, when executed by the processor, cause the system to perform operations, comprising:
in the isochronous communication device, for each isochronous interval of a plurality of isochronous intervals, transmitting isochronous data information over the bus to the asynchronous communication device, wherein the isochronous data information comprises the isochronous interval and a duration of isochronous data for transmission within the isochronous interval, and is transmitted during prior data transmission in another isochronous interval preceding the isochronous interval; and
in the asynchronous communication device, reserving the common radio frequency spectrum for the duration of the isochronous data transmission, and
based on the isochronous data information received via the bus, calculate an amount of asynchronous data to aggregate for transmission within the isochronous interval after the duration of the isochronous data transmission.

16. The system of claim 15, wherein the isochronous communication device comprises a Bluetooth® Low Energy (BLE) communication device, and wherein the co-located asynchronous communication device comprises an IEEE 802.11 WLAN (Wi-Fi®) communication device.

17. The system of claim 16, wherein the isochronous interval comprises a BLE isochronous (ISO) interval and the duration of the isochronous data transmission comprises a duration of BLE isochronous data transmission within the ISO interval, the operations further comprising:
reserving the common radio frequency spectrum for the duration of the BLE isochronous data transmission; and
aggregating Wi-Fi data for transmission within the BLE ISO interval after the duration of the BLE isochronous data transmission.

18. The method of claim 17, wherein the isochronous data information further comprises a BLE transmission mode selected from one of a broadcast isochronous stream (BIS) and a number of connected isochronous streams (CIS).

19. The method of claim 17, wherein the BLE isochronous data comprise a BLE audio stream.

20. The method of claim 19, wherein the BLE audio stream comprises one of a connected isochronous stream (CIS) to a connected isochronous group (CIG), and a broadcast isochronous stream (BIS) to a broadcast isochronous group (BIG).

* * * * *